United States Patent Office 3,359,328
Patented Dec. 19, 1967

---

3,359,328
HALOPHENOXY NORBORNENES
Carleton W. Roberts, Midland, and Daniel H. Haigh, Beaverton, Mich., assignors to The Dow Chemical Company, Midland, Mich., a corporation of Delaware
No Drawing. Continuation of application Ser. No. 239,806, Nov. 23, 1962. This application Oct. 25, 1966, Ser. No. 589,461
4 Claims. (Cl. 260—612)

This application is a continuation of application Ser. No. 239,806, filed Nov. 23, 1962 and now abandoned.

This invention relates to organic chemistry, and more particularly to compounds having the formula:

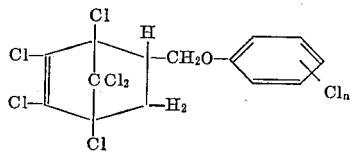

wherein n represents an integer from 2–5, inclusive.

These new compounds may be prepared by the Diels-Alder diene synthesis. The reaction may be simply carried out by causing a reaction of a hexachlorocyclopentadiene as the diene with, as dienophile, an allyloxy-halophenyl ether of the formula

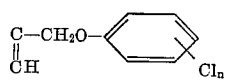

The reactants are consumed in equimolecular amounts and may thus be supplied to the reaction. It is advantageous but not necessary to use an inert liquid reaction medium, such as xylene, hexane, heptane, octane, nonane, petroleum ether, benzene, toluene, cumene, ethylbenzene, diethylbenzene, ethyltoluene, chlorotoluene, chloroethylbenzene, chloroxylene, and the like, of which the boiling serves to control the reaction temperature. The reaction may be carried out at any temperature from about 60° C. to about 200° C., but is preferably carried out at about 100° C. to 160° C. A reaction mixture of the reactants and reaction medium, if any, may be brought together in a reaction vessel whereupon some of the desired reaction takes place to some extent. When more rapid rate of reaction is desired, the reactants may be caused to react at a higher rate by heating the reaction mixture. The reaction usually goes to completion in from about one hour to about 60 hours, with formation of desired product and minor amounts of other substances.

The products of the present invention are conveniently prepared in an alternative and preferred synthesis. In such preferred synthesis, there is first prepared a halomethyl hexachlorobicycloheptene of the formula

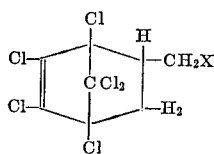

wherein X is a halogen of atomic weight of from about 25 to about 150. This compound is readily prepared by the Diels-Alder reaction of hexachlorocyclopentadiene of the formula

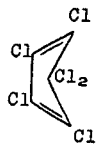

and 1-halo-2-propene. The halogen of the halopropene may be chlorine, bromine, or iodine; if chlorine, the compound reacts in the subsequent preparation at a disadvantageously slow rate, but under employed conditions, exclusively at the site of the chlorine on the methylene side chain. When the said halogen is bromine, the resulting bromomethylhexachlorobicycloheptene compound enters readily into the further reactions preparative of the present invention and product is obtained in good yield. When iodine is employed good results are obtained but the necessary starting substances are disadvantageously costly.

In any case, the said halomethylhexachlorobicycloheptene is then caused to react with a monoalkali metal derivative of a polychlorophenol. Reaction is caused by heating the reactants together gently, as in inert liquid reaction medium. The ions of alkali metal halide are liberated and the present product formed. If desired, the monoalkali metal derivative of the phenol may be formed and consumed in situ by the simple expedient of combining the phenol, alkali metal, and halomethylhexachlorobicycloheptene in a reaction mixture. Instead of alkali metal, the hydroxide, carbonate, or bicarbonate of such substance may be employed.

*Example I.—Preparation of 1,2,3,4,7,7-hexachloro-5-(2,4-dichlorophenoxymethyl)-2-norbornene.*

Allyl (2,4-dichlorophenyl) ether was prepared in the manner of Raiford and Howland, on page 1051 of volume 53 of the Journal of the American Chemical Society. In a one liter, 3-necked, round-bottomed flask, equipped with a stirrer, reflux condenser, heating mantle and addition funnel was placed 50.75 grams (0.25 mole) of allyl (2,4-dichlorophenyl) ether in 500 milliliters of meta xylene as solvent. This mixture was heated to reflux, about 140–150° C., and 68 grams (0.25 mole) of hexachlorocyclopentadiene was added portion-wise at a rate to maintain gentle reflux, over about a half hour. Reflux temperature was maintained for 24 hours, and the resulting mixture then cooled to room temperature.

Meta-xylene solvent was removed by fractional distillation and there was obtained, in good yield, a brown, oily liquid 1,2,3,4,7,7 - hexachloro - 5-(2,4-dichlorophenoxy methyl)-2-norbornene product. The structure was confirmed by infrared spectrum. The said product contains a small, undetermined proportion of 2,4-dichlorophenol which is removed by fractional crystallization from a methanol-water solvent system. The pure product is a white crystalline solid melting with decomposition.

*Example II.—Preparation of 1,2,3,4,7,7-hexachloro-5-(2,3,5-trichlorophenoxymethyl)-2-norbornene*

Allyl (2,4,5-trichlorophenyl) ether was prepared according to the procedure described by Felton and McLaughlin in the Journal of Organic Chemistry, volume 12, page 298.

In a one-liter, 3-necked, round-bottomed flask equipped with a stirrer, reflux condenser, heating mantle and addition funnel was placed 59.37 grams (0.25 mole) of allyl (2,4,5-trichlorophenyl) ether in 500 milliliters of meta-xylene. The resulting mixture was heated to reflux, about 140–150° C., and 68 grams (0.25 mole) of hexachlorocyclopentadiene was added portion-wise, over about a half hour, at a rate to maintain gentle reflux. Reflux temperature was maintained for 24 hours, and then the resulting mixture was cooled to room temperature. Solvent was removed by distillation and there was obtained, in good yield, a brown, oily 1,2,3,4,7,7-hexachloro-5-(2,4,5-trichlorophenoxy-methyl) - 2 - norbornene product. Identity was confirmed by infrared spectrum which also indicated about ten percent 2,4,5-trichlorophenol. The product is purified as in the foregoing example and has similar properties: its temperature of softening with decomposition is higher.

The products can be used in a completely crude form for many of their advantageous uses. When it is desired to recover a desired product compound essentially pure, the product of reaction can be distilled at a subatmospheric pressure, such as about 100 millimeters mercury, absolute, to remove the liquid reaction medium and thereafter at a lower pressure such as about 0.1 mm., to obtain the essentially pure compound. Other methods of purification known to those skilled in the art, can be applied to the present compounds, for example, fractional crystallization. Elemental analysis gave values suitable for the compound and the assigned structure was confirmed by infrared spectrum analysis.

In procedures essentially identical with those of Examples I and II other chlorine-containing phenoxymethyl norbornenes are prepared, using any or several of various hydrocarbon and substituted hydrocarbon liquids as solvent.

Allyl (2,3,4,5-tetrachlorophenyl) ether is caused to react with hexachlorocyclopentadiene in a natural solvent mixture of dichlorobenzenes resulting from the dichlorination of benzene, to prepare a 1,2,3,4,7,7-hexachloro-5-(2,3,4,5-tetrachlorophenoxymethyl)-2-norbornene, as an oily liquid product which, upon fractional precipitation from solvent, yields a colorless crystalline solid having fungicidal properties.

In similar procedures but employing allyl pentachlorophenyl ether and hexachlorocyclopentadiene there is obtained a 1,2,3,4,7,7-hexachloro-5-pentachlorophenoxymethyl-2-norbornene as an oily product which yields a white, crystalline solid product upon fractional crystallization. The assigned structure is confirmed by infrared analysis. The compound is fungicidal.

In similar procedures other products of the present invention are readily prepared.

Illustrative of utility in the present compounds, the compound 1,2,3,4,7,7-hexachloro-5-(2,4,5-trichlorophenoxymethyl)-2-norbornene was dispersed in water with the aid of essentially inert co-solvents and wetting agents to prepare an aqueous spray composition comprising the said compound at the rate of 10 parts per million parts, all by weight, of total composition. The application of this dispersion to wet thoroughly for 24 hours all surfaces of spores and mycelial fragments of brown rot of peaches (*Monilinia fructicola*) resulted in complete kill of the fungus. A check group treated identically but for the toxicant of the present invention showed no loss of viability, but grew well when cultured.

What is claimed is:
1. Compound of the formula:

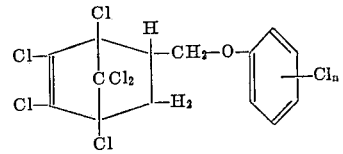

wherein $n$ represents an integer from 3–5 inclusive.

2. Compound of claim 1 which is 1,2,3,4,7,7-hexachloro-5-(2,4,5-trichlorophenoxymethyl)-2-norbornene.

3. Compound of claim 1 which is 1,2,3,4,7,7-hexachloro - 5 - (2,3,4,5 - tetrachlorophenoxymethyl)-2-norbornene.

4. Compound of claim 1 which is 1,2,3,4,7,7-hexachloro-5-pentachlorophenoxymethyl-2-norbornene.

References Cited
UNITED STATES PATENTS 2,721,882 10/1955 Schmerling ‑‑‑‑‑‑‑‑‑ 260—612
2,900,297 8/1959 Wygant ‑‑‑‑‑‑‑‑‑‑‑‑‑ 167—30

BERNARD HELFIN, *Primary Examiner.*